(12) United States Patent
Gonzalez Martinez et al.

(10) Patent No.: US 9,118,648 B2
(45) Date of Patent: Aug. 25, 2015

(54) METHOD FOR AUTHORIZING ACCESS TO PROTECTED CONTENT

(75) Inventors: Diego Gonzalez Martinez, Madrid (ES); David Lozano Llanos, Madrid (ES); Jorge Munuera Andreo, Madrid (ES); Enrique Velez Tarilonte, Madrid (ES)

(73) Assignee: TELEFÓNICA, S.A. (ES)

( * ) Notice: Subject to any disclaimer, the term of this patent is extended or adjusted under 35 U.S.C. 154(b) by 34 days.

(21) Appl. No.: 13/989,748

(22) PCT Filed: Oct. 24, 2011

(86) PCT No.: PCT/EP2011/068513
§ 371 (c)(1),
(2), (4) Date: Nov. 14, 2013

(87) PCT Pub. No.: WO2012/069263
PCT Pub. Date: May 31, 2012

(65) Prior Publication Data
US 2014/0068746 A1    Mar. 6, 2014

Related U.S. Application Data

(60) Provisional application No. 61/416,901, filed on Nov. 24, 2010.

(51) Int. Cl.
*G06F 7/04* (2006.01)
*G06F 15/16* (2006.01)
(Continued)

(52) U.S. Cl.
CPC ............ *H04L 63/08* (2013.01); *H04L 63/0884* (2013.01); *H04L 63/10* (2013.01);
(Continued)

(58) Field of Classification Search
CPC .............. H04L 63/083; H04L 63/0838; H04L 63/0846; H04L 63/10; H04L 63/105; H04L 9/32; H04L 9/3213; H04L 9/3228; G06F 21/30; G06F 21/31; G06F 21/43
USPC ................................................ 726/4, 6, 9, 27
See application file for complete search history.

(56) References Cited

U.S. PATENT DOCUMENTS 6,230,002 B1 * 5/2001 Floden et al. ................. 455/411
2006/0206709 A1 * 9/2006 Labrou et al. ................. 713/167
(Continued)

FOREIGN PATENT DOCUMENTS

WO     03084127       10/2003
WO     2008102220      8/2008

OTHER PUBLICATIONS

Hammer-Lahav E et al: "The OAuth 1.0 Protocol; rfc5849.txt". The Oauth 1.0 Protocol; RFC5849.Txt.; Internet Engineering Task Force. IETF; Standard. Internet Society (ISOC) 4. Rue Des Falaises CH—1205 Geneva. Switzerland. Apr. 20, 2010. pp. 1-38. XP015070768.

(Continued)

*Primary Examiner* — Brandon Hoffman
*Assistant Examiner* — Jayesh Jhaveri
(74) *Attorney, Agent, or Firm* — Cantor Colburn LLP (57) ABSTRACT

The invention refers to a method for authorizing access to a third party application, called client (2), to protected resources owned by a user (1) and hosted in a server (3). The method comprising: the client being used by the user asking for a temporary token to the server; the server sending a first SMS to the user, said first SMS providing means to authenticate the user; authenticating the user by the means provided in previous two steps; the user authorizing the client; the server sending a second SMS to the user providing some information needed to obtain an access token; the client getting the information of the previous step from the user and the access token; the client accessing protected resources using the access token.

12 Claims, 4 Drawing Sheets

(51) Int. Cl.
*G06F 17/30* (2006.01)
*H04L 29/06* (2006.01)
*H04L 29/08* (2006.01)
*H04L 9/32* (2006.01)
*G06F 21/30* (2013.01)
*G06F 21/31* (2013.01)
*G06F 21/43* (2013.01)

(52) U.S. Cl.
CPC ........... *H04L 63/18* (2013.01); *H04L 67/2814* (2013.01); *G06F 21/30* (2013.01); *G06F 21/31* (2013.01); *G06F 21/43* (2013.01); *H04L 9/32* (2013.01); *H04L 9/3213* (2013.01); *H04L 9/3228* (2013.01); *H04L 63/083* (2013.01); *H04L 63/0838* (2013.01); *H04L 63/0846* (2013.01); *H04L 63/105* (2013.01)

(56) References Cited

U.S. PATENT DOCUMENTS

| | | | |
|---|---|---|---|
| 2006/0236105 A1* | 10/2006 | Brok et al. | 713/169 |
| 2007/0107050 A1* | 5/2007 | Selvarajan | 726/5 |
| 2007/0266257 A1* | 11/2007 | Camaisa et al. | 713/182 |
| 2009/0047929 A1* | 2/2009 | Chesnutt et al. | 455/411 |
| 2009/0221307 A1* | 9/2009 | Wolak et al. | 455/466 |
| 2009/0228966 A1* | 9/2009 | Parfene et al. | 726/7 |
| 2009/0300738 A1* | 12/2009 | Dewe et al. | 726/6 |
| 2010/0100725 A1* | 4/2010 | Ozzie et al. | 713/155 |
| 2010/0142516 A1* | 6/2010 | Lawson et al. | 370/352 |
| 2010/0146259 A1* | 6/2010 | Tatham | 713/152 |
| 2010/0331020 A1* | 12/2010 | Modin | 455/466 |
| 2011/0071891 A1* | 3/2011 | Gavita et al. | 705/14.16 |
| 2012/0042371 A1* | 2/2012 | Gur et al. | 726/9 |
| 2012/0054841 A1* | 3/2012 | Schultz et al. | 726/6 |
| 2012/0210448 A1* | 8/2012 | Vrancken et al. | 726/29 |
| 2012/0317624 A1* | 12/2012 | Monjas Llorente et al. | 726/4 |
| 2014/0053251 A1* | 2/2014 | Chen et al. | 726/6 |

OTHER PUBLICATIONS

HTTP Get Access Token Operation; Global Giving API; 2014; https://www.globalgiving.org/api/get-access-token.html.
Anonymous: 9.0 Using the Invitation 1-15 API II Oct. 5, 2010. XP55032919. Retrieved from the Internet: URL:http:jjweb.archive. orgjweb/20101005004846/http://developer.veriplace. comjdevportaljdeveloperguidejinvitation-api.html.

* cited by examiner

METHOD FOR AUTHORIZING ACCESS TO PROTECTED CONTENT

FIELD OF THE INVENTION

The present invention relates generally to an authentication method for a user of a telecommunication system and specifically to authorizing third parties to access a server on behalf of the user without using his credentials, being said user an owner of protected content. The invention relies on the SMS as a special channel to be used in telco environments for the transmission of authorization related information.

BACKGROUND OF THE INVENTION

With the increasing use of distributed web services and cloud computing, third-party applications require access to server-hosted resources. Most of these resources are usually protected and require explicit user authorization, after successful user authentication using the resource owner's credentials (typically a username and password). In the traditional client-server authentication model, a client accessing a protected resource on a server presents the resource owner's credentials in order to authenticate and gain access.

The problem is that, in order for these applications to access user data on other sites, they ask for usernames and/or passwords. Not only does this require exposing user passwords to someone else—often the same passwords used for online banking and other sites—it also provides these applications with unlimited access to do as they wish, so that they can do anything, including changing the passwords and lock users out.

It means that the solution must provide the user not only with the confidentiality of his/her credentials but also with the ability to restrict access to a limited subset of the resources they control, to limit access duration, or to limit access to the HTTP methods supported by these resources. The OAuth protocol 1.0, defined in "*RFC 5849—The OAuth 1.0 Protocol*" provides such a solution, based on a 3-legged model and web-redirections.

OAuth 1.0 is an open protocol to allow secure API authorization in a simple and standard method from desktop and web applications, available both for Trusted and Non-Trusted Consumers (Clients). OAuth, as specified, is directly applicable to grant access to resources in REST services, but can also be used for example in SOAP-based web services.

In order for the client to access resources, it first has to obtain permission from the resource owner by means of the OAuth API. This permission is expressed in the form of a token and matching shared-secret. The purpose of the token is, as already explained, to make it unnecessary for the resource owner to share its credentials with the client. Unlike the resource owner credentials, tokens can be issued with a restricted scope and limited lifetime, and revoked independently.

Figure 1:
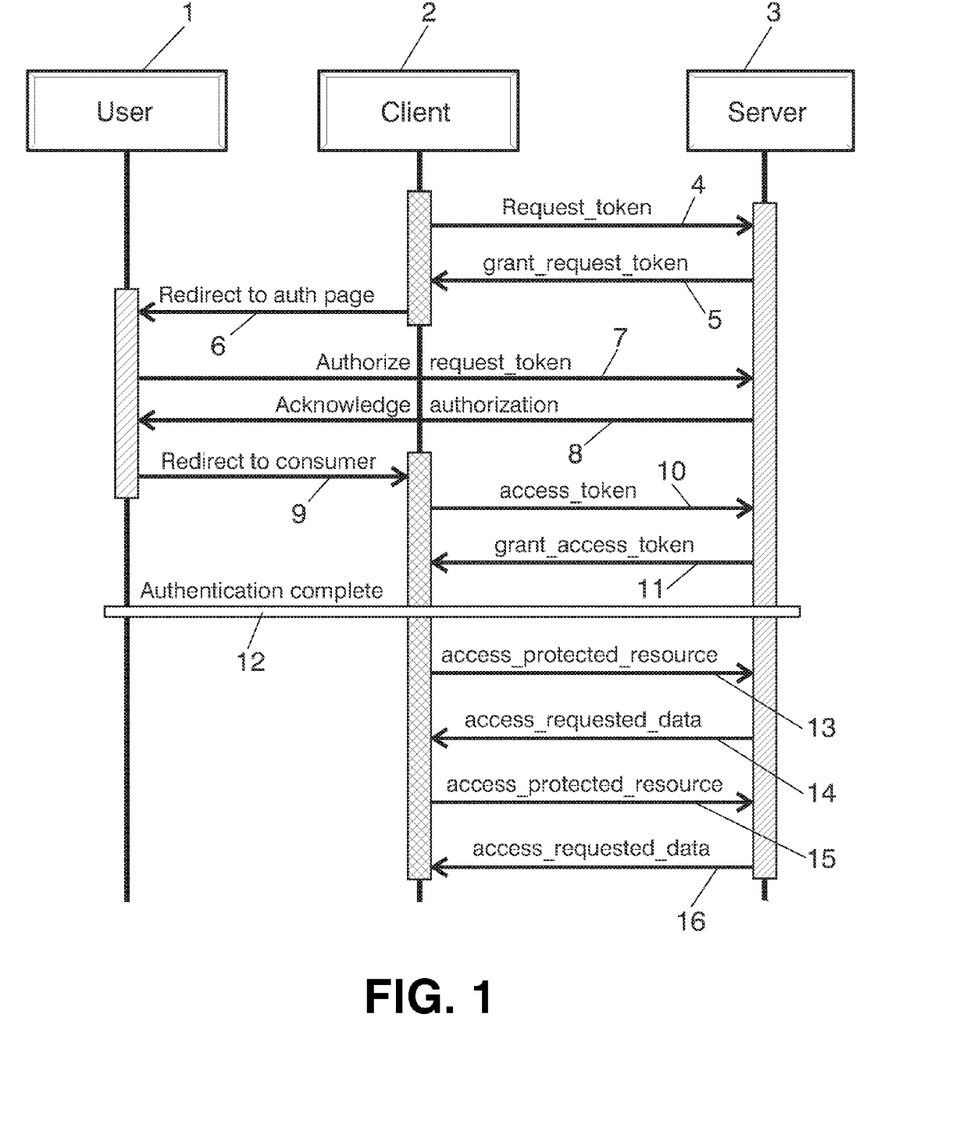
FIG. 1 illustrates an overview of the 3-legged access scenario. Prior art.

In short, the main purpose of the OAuth protocol is to provide the means for the consumer to gain a valid Access-Token following the interactions that are summarized on FIG. 1, which shows the 3-legged access scenario.

In this 3-legged access mode, there are two tokens with crucial roles:

In the first place, Request Token is used as a reference within the delegated authorization procedures. More concretely, Request Tokens are used by the Client to ask the User to authorize access to the Protected Resources. To do this, the user is redirected to a portal where the user is authenticated and the user authorizes the access to the Protected Resources owned by him. Then, the client receives a verification code and exchanges this code and the User-authorized Request Token, that is recommended to have a limited lifetime, for an Access Token.

Finally, this Access Token is used by the Client to access the APIs on behalf of the User, instead of using the User's credentials (user and password). Access Tokens may limit access to certain APIs or even resources within a given API.

Therefore, step by step, FIG. 1 involves the client 2 sending a request for a Request_token 4 to the Server 3. Steps 5 and 6 provide the Request_token to the client and inform the user 1 about the action and steps 7 and 8 user informs the server that the client is authorized. Then it is redirected 9 to the client and the client obtains an Access_token in steps 10 and 11, thus the authentication 12 is completed. Steps 13, 14, 15 and 16 comes after the authentication, the client access to data on the server on behalf of the user.

There are other authentication methods that make use of different mechanisms. Also, the Short Message Service (SMS) has already been used together with other techniques to send the final user the needed credentials to access resources.

For instance, US patent application publ. US 2010/0100725 A1 discloses a method for providing user authentication. When a user of a website or an enterprise server system wishes to access certain information or perform certain transactions on the website/server, they are asked to enter a user name and password into a user interface (UI). Using a password associated with a particular username can provide for authentication of the user, for example, because the password is typically known only to the user who is registered with the website/server. However, security for remote access to websites and servers can be compromised if passwords are used by those other than the registered user (e.g., by identity thieves).

Current multi-factor authentication techniques include utilizing telephones or mobile devices as a second authentication factor. As an example, when a website user attempts to purchase an item online, the host website can send a short message service (SMS) message (e.g. a text message) to the user's mobile device (e.g., mobile phone). In this example, after receiving the SMS message, the user can reply with an authentication key provided by the website. In this way, for example, an identity thief would need the user's username, password, and designated mobile device in order to complete the authentication.

The main problem, as stated above, is that OAuth protocol is based on Web redirections (HTTP methods). This means that OAuth is appropriate for web applications and in general for usage environments where redirecting the user to a web page for authentication and authorization is an appropriate User Experience. For other environments or applications, such as non-web based applications installed in a mobile handset, the web redirections do not provide an appropriate User Experience, specially the step where the user has to enter his/her credentials in a web as authentication method. Further, for non-web native mobile handset Applications, the web-redirection implies that the Application looses the control of the User flow.

SUMMARY OF THE INVENTION

The present invention refers to an authentication and authorization method, which includes a mode based on SMS interactions.

The target of the proposed method is to extend the OAuth protocol by substituting the web-redirections with SMS-interactions. This changes the user experience and enables new usage scenarios by defining a method for authorizing access to a third party application, called client, to protected content owned by a user and hosted in a server; the method comprises:

the client being used by the user asking for a request token to the server;

in addition to responding to the client with said request token, the server sending a first SMS to the user, said first SMS providing means to authenticate the user;

after the authentication of the user and the later authorization for the client to access the protected resources, the server sending a second SMS to the user's device providing some information needed to obtain an access token or directly the access token;

the client getting the information of the previous step through user input or directly from the device and, if applicable, exchanging the information for an access token.

the client accessing protected content using the access token.

the method allows sending only the first SMS, the second SMS or both. If the first SMS is to be sent the client has to signal who the user is, implicitly signaling where to send the first SMS; and if the second SMS has to be sent the client has to signal where and how to send the second SMS.

The invention comprises defining a first parameter in the client to indicate who the user is and where to send the first SMS.

The means of the first SMS to authenticate the user may be an URL carrying a SMSToken and an indication for the user to click on the URL, or the means of the first SMS to authenticate the user may be a SMSToken and indications for the user to send a SMS with the SMSToken to a designated number.

The information needed to obtain an access token, may be a verification code included in the second SMS which the user gives to the client; or it may be a verification/authorization code included in the second SMS, being the second SMS a binary SMS sent to an indicated port of the terminal of the user where the client obtains the verification/authorization code automatically. Alternatively, the access token may be directly included in the second SMS which the user gives to the client, or the access token may be directly included in the second SMS, being the second SMS a binary SMS sent to an indicated port of the terminal of the user where the client obtains the access token automatically.

The invention may also include a second parameter from the client for signaling what information is needed and how it must be communicated.

Present invention may use OAuth protocol for performing the method steps. Extensibility of the parameters in said protocol allows defining an additional parameter non-specified in OAuth protocol as the first parameter of the invention. The second parameter may also be the parameter of the OAuth protocol described as a redirection URI to which the authorization server will redirect the user-agent back once authorization has been obtained (or denied). This parameter is named oauth_callback in OAuth 1.0. In this document it will be referred as 'callbackURL'

These and other aspects of the invention will be elucidated with reference to the embodiments described hereinafter.

BRIEF DESCRIPTION OF THE DRAWINGS

To complete the description and in order to provide for a better understanding of the invention, a set of drawings is provided. Said drawings form an integral part of the description and illustrate preferred embodiments of the invention, which should not be interpreted as restricting the scope of the invention, but just as examples of how the invention can be embodied. The drawings comprise the following figures.

DETAILED DESCRIPTION OF THE PREFERRED EMBODIMENTS

Reference will now be made in detail to a preferred embodiment of the present invention. The proposed scenario is supported by previous protocols that are being massively adopted as OAuth 1.0. This method considers a 3-legged model in which three different entities (or legs) are directly involved in the procedures to access the Application Program Interfaces, also called APIs:

The APIs Provider or Resource Server

The Consumer or Client

The final user or resource owner.

Figure 2:
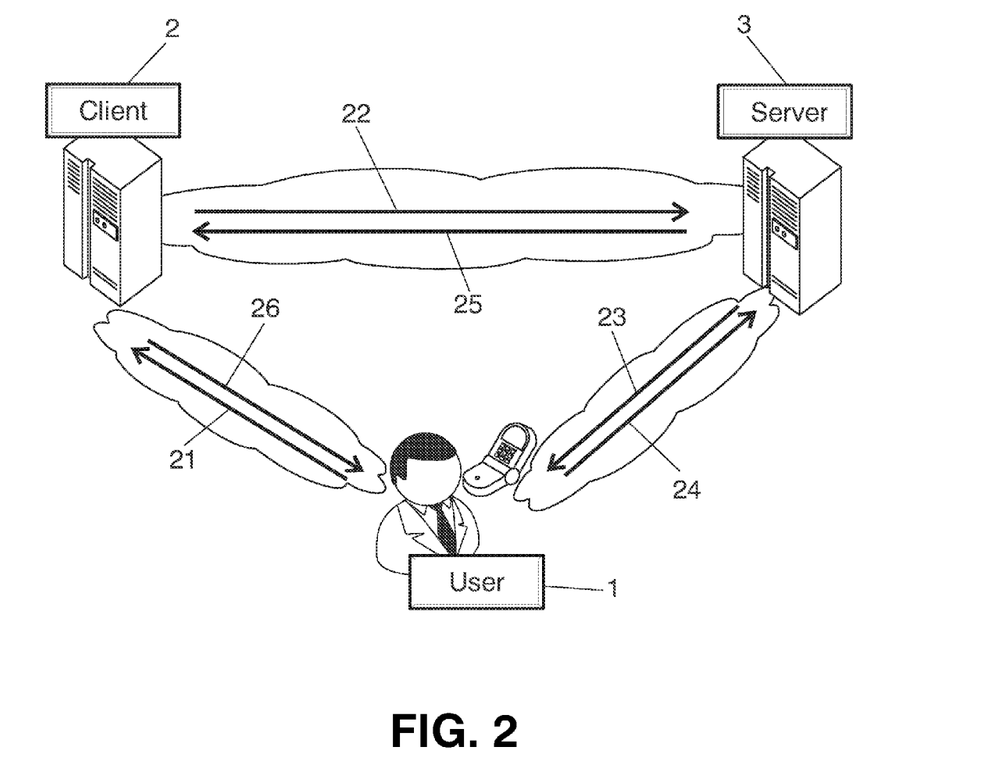
FIG. 2 shows the interactions between entities in OAuth protocol.

The interactions between these entities are summarized on FIG. 2. The user makes the original request 21 for resource to the client. The client "redirects" 22 the request to the server for authorization. The response is from server domain asking 23 the user for authentication. Then, the user authorizes 24 the client. The client obtains 25 the token that provide him access. And finally the client confirms 26 access.

The most important current methods provide a non-trusted Client with access to the APIs on behalf of the final user. To enable this, the final user must directly interact by a web access with the API provider in order to authenticate and explicitly authorize the client to access the APIs in his/her name. This way, the user does not need to share his/her credentials with the untrusted clients and he/she can control the allowed actions for the Client, thus, the Client acts under the responsibility of the final user.

The proposed invention defines an alternative flow to the one defined in the OAuth 1.0 RFC in order to avoid the web redirections and substitute them by SMS interactions with the handset of the User. Different variations are considered:

1. The first part of the procedure consists on sending an authentication SMS to the handset of the final user. The SMS will include a token not known by the non-trusted consumer that will be used to authenticate the user. In the following this token is named "SMSToken". Depending on the handset characteristics and on the available connectivity, two alternatives may be used by the final user:

a. The SMS may include a link carrying the SMSToken and the user may click on the link. Either by WAP or Web access, the user will be authenticated. Even though the user handset uses a browser, the user need not have to include his credentials in a web. In this method, the User will need to use the opened browser to authorize the consumer (e.g.: Click on "I accept").

b. The SMS may directly include the SMSToken and the user may answer the SMS with another SMS carrying the SMSToken. By this SMS access the user will be authenticated and request token (associated to the SMSToken) authorized. This second alternative enables the procedure in handsets without a browser, or where the use of a browser is discouraged.

In this method the SMS shall give enough information to the user about what access and to which consumer is going to be authorized.

2. The second part of the procedure also has two alternatives:

a. In the first alternative, a binary-SMS is sent to an indicated port in the handset of the user. The SMS carries the OAuth verification code. The application of the client in the handset automatically obtains, without user intervention, the verification code from the SMS and uses it to obtain the Access Token. This second part should be used taking into account the risk of binary-SMS in certain Operating Systems of the handset, as security risks may exist. It should also be taken into account that for this binary-SMS alternative, the Client has to be running in the User device that receives the SMSs.

b. In the second alternative, another SMS is sent to the handset of the user including the OAuth verification code. The user will copy the verification code and will give it to the Client in order to obtain the AccessToken. In this second alternative, the user handset where the SMS is received need not be the device where the Client is running.

The two parts of the procedure are independent, i.e.: in the proposed mechanism it is possible to apply only the first part of the procedure, only the second part of the procedure or both. The first part of the procedure substitutes the first OAuth redirection and the second part of the procedure substitutes the second OAuth redirection or alternative OAuth process of showing the verification code in web-browser for the user to copy it.

The proposed invention makes intelligent use of OAuth parameters, and uses new parameters that integrated in the OAuth protocol indicate that OAuth-SMS is requested and which of the new SMS-based solutions is being requested.

Figure 3:
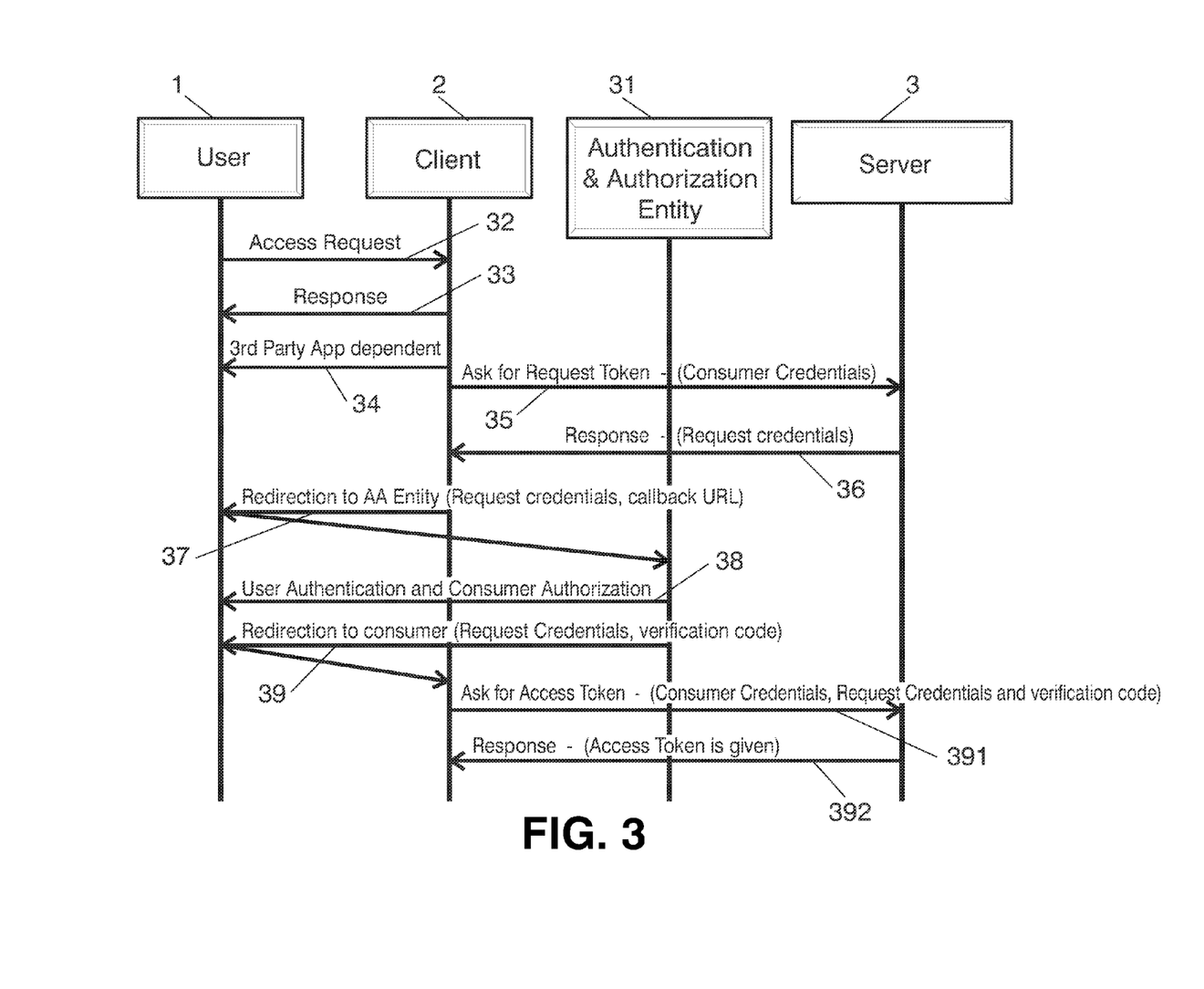
FIG. 3 shows a sequence diagram for OAuth Access.

As explained before, two different modes are considered, namely 'OAuth Access' and 'OAuth SMS-Access'. The first mode enables the process by using web redirections, and the second mode enables the process by substituting the web redirections with SMS interactions. In an attempt to introduce the second mode, it is important to understand the existing workflow that initiates with the execution of the first mode, 'OAuth Access'. FIG. 3 shows the basic operation of 'OAuth Access' in prior art.

As it can be seen in FIG. 3, the process of getting an Access Token is divided in three different steps:

1. Obtaining an unauthorized Request Token, through a "HTTP GET Request Token operation".

Steps 32, 33, 34, 35 and 36 represent the access request from the user to the client, the response of the client, the ask for a Request Token to the server and the response of the server.

2. Web Delegation: it is the intermediate step where the user is authenticated and the Client is authorized to access the APIs. As a result the Request Token previously obtained is authorized.

Step 37: redirection to an Authentication-Authorization Entity (or AA Entity) 31

Step 38: user authentication and client authorization     Step 39: redirection to the client 3. Obtaining the Access Token, through a "HTTP GET Access Token operation".

Steps 391 and 392 represent the client asking for an Access Token to the server and the corresponding response from the server.

Figure 4:
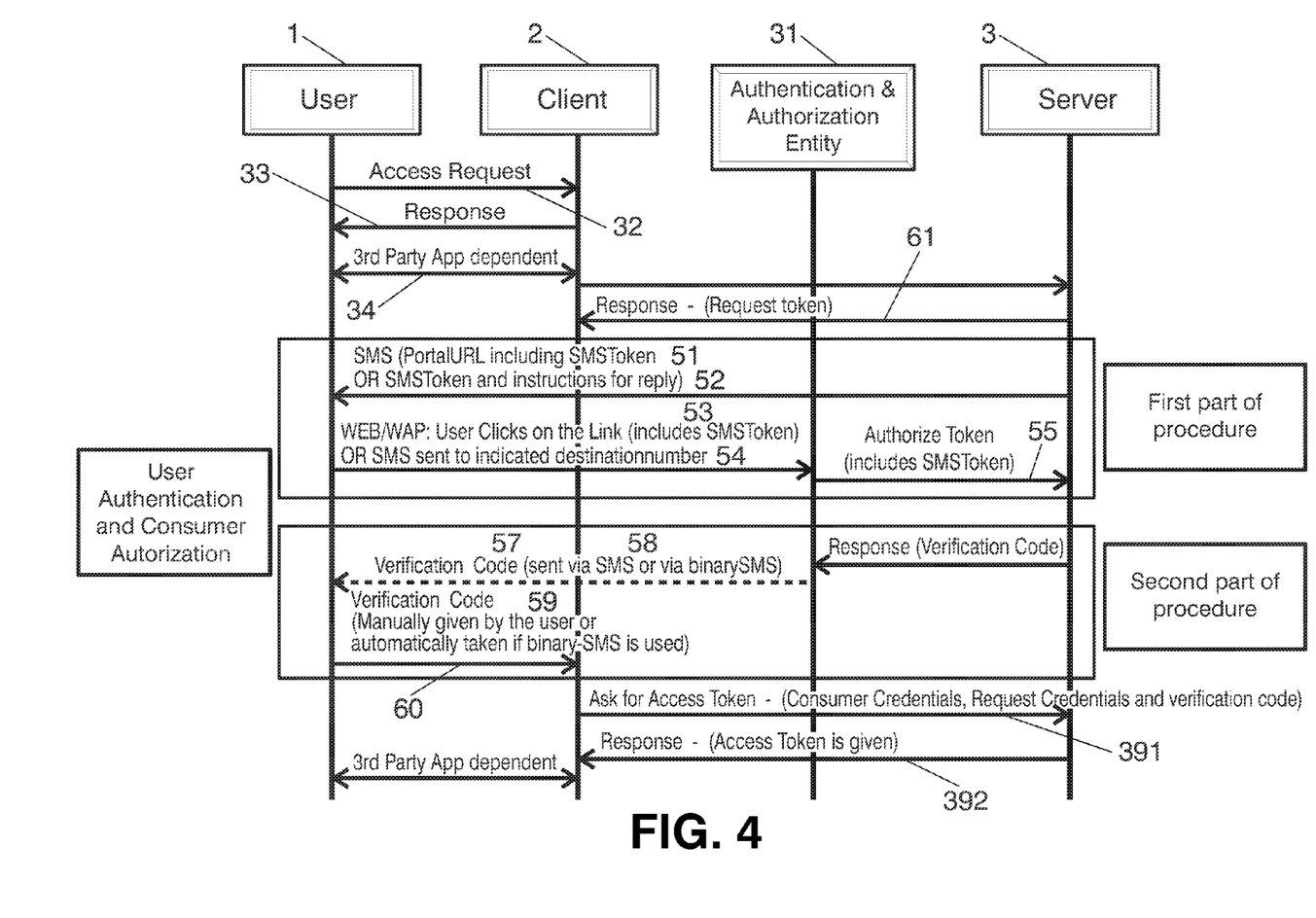
FIG. 4 shows a sequence diagram of an embodiment of the invention.

The new mode of the protocol introduces some variations, as shown in FIG. 4.

As it can be seen from FIG. 4, the process of getting an Access Token in OAuth 1.0 is divided in the following different steps:

1. Obtaining an unauthorized Request Token 61, through a "HTTP GET Request Token operation".

If the first part of the proposed procedure is requested to be executed as alternative to regular OAuth:

a. The Client includes a parameter to indicate who the user is and to know where to send the SMS. This is achieved by the use of an additional parameter non-defined in the OAuth protocol, but can also be achieved by the reuse or an special usage of an existing parameter in OAuth protocol. Extensibility of the parameters in the protocol allows to define a new parameter. This new parameter may be used as the indication that SMS-OAuth is requested to be used, or a different specific parameter may also be used.

b. The Client optionally includes a parameter to indicate whether the first SMS should be sent:

I. Including an URL carrying an SMSToken, typically as a query parameter, and an indication for the user to click on the URL.

II. Or the SMSToken together with the authorization information and indications for the user to send an SMS with the request token to a designated number.

Both of them make the user to authenticate himself, thus authorize the client and an Authorize Token is send 55 to the server.

Alternatively, the user may only have to simply reply to the received SMS.

If this parameter is not included a default behaviour of the two described can be applied.

a. and b. can be done by other combinations of parameter usage. For example a single parameter may be used to signal either of the different combinations.

If the second part of the proposed procedure is requested to be executed as an alternative to regular OAuth:

c. The Consumer signals by means of different settings of callbackURL parameter which SMS-Access method mode is being used for the second interaction.

I. SMS to the final user

II. Binary-SMS to an indicated port in order to awake an application in the terminal. The port where to send the binary-SMS may be indicated by the client or may be a predefined well-known port.

Alternatively to step c), the callbackURL may be set with an specific value (e.g.: 'oob') and a new parameter may signal the SMS/browser or binary-SMS mode.

The new parameter carrying the user identity (e.g.: the MSISDN or a nickName) triggers the first part of proposed procedure.

The special use of the callbackURL (e.g.: not include an URL but the needed information such as the port of the application in Binary-SMS mode or an specific string in SMS mode) triggers the second part of proposed procedure. Therefore, the first part, the second part or both parts of the procedure may be triggered by the client.

The parameter combination described in previous paragraphs is an example, but other combinations making use of existing OAuth parameters and the definition of new parameters can be used to trigger one or more parts of the procedure.

2-a. If the first part of the procedure was triggered, the Server sends an SMS to the user that the Client indicates in the Request Token request. Depending on step 1-b:

i. The SMS includes an URL 51 pointing to an Authorization and Authentication (AA) Entity. The URL includes the SMSToken, typically as a query parameter. This way, the user uses this URL to authenticate himself, because the SMS was sent to his handset. The user gives authorization to the Client in the opened web-browser, but there is no need for the user to include his credentials.

ii. The SMS directly includes the SMSToken 52, information about the authorization, and requests the user to reply with another SMS including the request token. This way, the user uses this SMS-reply to authorize the consumer by clicking on the provided URL 53 or by replying to indicated number with another SMS carrying the SMSToken 54. The User is also authenticated because the SMS was sent to his handset.

2-b The AA entity requests the SMSToken authorization and obtains 56 a verification code. If the second part of the procedure was triggered, depending on whether the "Get request Token" in step 1-c indicated either SMS to the final user or binary-SMS to be used:

a. The AA entity sends 57 an SMS with the verification code to the terminal of the user. The user gives 59 this verification code to the client.

b. The AA entity sends 58 a binary SMS to the port indicated in the "Get Request Token" and carrying the verification code or the access token. The application in the handset of the user, without user intervention, obtains 60 the verification code or the access token.

The SMSToken is not known by the non-trusted client, but there is an association in ServiceProvider between SMSToken and RequestToken.

3. Obtaining the Access Token in steps 391, 392, through a "HTTP GET Access Token operation", except for the case where access token was already sent in binary SMS as described in 2-b-b.

To sum up, the proposed invention extends the OAuth protocol by substituting the web-redirections with SMS-interactions. This changes the user experience and enables new usage scenarios, such as the following:

Elimination of the need of the user providing their credentials (e.g.: user and password) in a web as authentication mechanism.

Use of OAuth in those devices that do not allow the use of browsers.

Use of OAuth when the Application is a native non-web application in a mobile handset, where the use of a browser may broke the User Interface of the application.

Use of OAuth when the Application is not able to receive HTTP redirections, for whatever reason (e.g.: A Client Side application in mobile handset)

As indicated before, the two parts are independent: it is possible to apply only the first part of the procedure, only the second part of the procedure or both. The first part of the procedure substitutes the first OAuth redirection and the second part of the procedure substitutes the second OAuth redirection or alternative OAuth process of showing the verification code in web-browser for the user to copy it.

The proposed method makes intelligent use of OAuth parameters, and uses new parameters that integrated in the OAuth API indicate that OAuth-SMS is requested and which of the new SMS-based solutions is being requested.

The proposed invention presents several advantages with respect to the current OAuth protocol developed by IETF.

Backwards compatibility with existing OAuth: it is completely compatible with the standard. It allows the consumer to signal and the server to detect the need of sending an SMS to the final user or to apply the existing OAuth method.

Increase in amount of potential users: the proposed method provides many users with access to several resources that could not be used because of their mobile device restrictions. The market of new services increases in a huge amount of potential users.

Enhanced User Experience in non-Web based applications: The proposed method enhances the user experience when the consumer application is not browser-based.

For these kinds of applications, the web redirections may be found by the user as more intrusive, as a non-web application requires to launch the browser and requires the user to give their credentials. The perception given to the user may also be of less-security.

The use of SMS-interactions, especially in mobile handset, may be better perceived by final users. Even when the first SMS carries an URL, it's the user who manually clicks on the URL to launch the browser. This gives the user a more-security perception.

More appropriate approach for non-Web based native Applications: The defined mechanism is more appropriate for native applications in mobile handsets. For these applications, the invocation of a browser implies losing the control of the user flow.

Applicability in non-Browser devices: The invention does not preclude applications from accessing protected resources in those cases in which the browser is not supported by the terminal. The SMS-reply may be better perceived by the user in contrast to the browser invocation for the user authentication.

Applicability of OAuth in Applications that do not support HTTP redirections and, therefore, will not be able to operate with OAuth, that requires HTTP redirections.

Different implementation options within the same solution: The new mechanism, based on SMS-interactions, offers different variations. These variations can be selected depending on the client characteristics, the Application characteristics (desktop, mobile, web).

It is to be understood that the above disclosure is an exemplification of the principles of the invention and does not limit the invention to the described embodiments.

The invention claimed is:

1. A method for authorizing access to a third party application, which is called client, to protected resources owned by a user and hosted in a server, the method comprising:
   a) the client asking for a temporary token from the server;
   b) in addition to responding to the client with said temporary token, the server sending a first SMS (Short Message Service) to the user, said first SMS providing means to authenticate the user;
   wherein the means to authenticate the user, included in the first SMS, are an URL (Universal Resource Locator) carrying a token not known for the client and an indication for the user to click on the URL, wherein the URL points to an Authorization and Authentication Entity, and the user is authenticated by clicking on the URL included in the SMS, which was sent to his handset;
   c) authenticating the user by the means provided in the previous steps;
   d) the user authorizing the client, in a web-browser opened by the user clicking on the URL included in the SMS;
   e) after the authentication of the user and the authorization of the client, the server sending a second SMS to the user providing information related to an access token;
   f) the client receiving the information related to the access token;
   g) the client getting the access token from the information received;
   h) the client accessing the protected resources using the access token.

2. The method according to claim 1 further comprising defining or using a parameter in the client to indicate who the user is and where to send the first SMS.

3. The method according to claim 1 further comprising defining or using a parameter in the client to indicate that an SMS or a binary-SMS has to be sent to the user after the user authentication and authorization.

4. The method according to claim 1, wherein the information related to the access token is a verification code included in the second SMS, said verification code is given to the client by the user.

5. The method according to claim 1, wherein the information related to the access token is a verification code included in the second SMS, being the second SMS a binary SMS sent to an indicated port of a handset of the user from which the client obtains the verification code directly.

6. The method according to claim 1, wherein the information sent in the second SMS is the access token, and said access token is given to the client by the user.

7. The method according to claim 1, wherein the information sent in the second SMS is the access token, being the second SMS a binary SMS sent to an indicated port of a handset of the user where the client obtains the access token directly.

8. The method according to claim 2, wherein a first parameter is defined by using an additional parameter non-defined in OAuth protocol 1.0.

9. The method according to claim 2, wherein a first parameter is defined by re-using a parameter defined in OAuth protocol 1.0.

10. The method according to claim 1 further comprising defining a second parameter in the client for signaling a type of information needed and how to communicate the information.

11. The method according to claim 1, wherein a second parameter is defined by using an additional parameter non-defined in OAuth protocol 1.0.

12. The method according to claim 8, wherein a second parameter is the oauth_callback parameter of the OAuth protocol 1.0.

* * * * *